United States Patent [19]
Fries

[11] 3,936,036
[45] Feb. 3, 1976

[54] MIXING DEVICE
[75] Inventor: Bernd Fries, Nuremberg, Germany
[73] Assignee: Demag Kunststofftechnik GmbH, Nuremberg, Germany
[22] Filed: Sept. 4, 1974
[21] Appl. No.: 503,117

[30] Foreign Application Priority Data
Sept. 14, 1973 Germany............................ 2346347

[52] U.S. Cl. .............................. 259/4 R; 23/252 R
[51] Int. Cl.² ............................................. B01F 5/02
[58] Field of Search .......... 259/4, 18, 36; 23/252 R; 425/4 R

[56] References Cited
UNITED STATES PATENTS
3,219,483  11/1965  Goos........................................ 259/4
3,658,302  4/1972  Duthion................................. 259/4
3,773,298  11/1973  Gebert................................. 259/18

FOREIGN PATENTS OR APPLICATIONS
859,688  1/1961  United Kingdom..................... 259/4

Primary Examiner—Robert W. Jenkins

[57] ABSTRACT

A mixing device for mixing two or more, preferably liquid, components to form a synthetic, e.g. cell forming, material prior to molding, in which the components are directed into a mixing chamber at an angle to one another. The side of the chamber remote from the nozzle is tapered, so that the point of intersection of the axis of the nozzle lies within the chamber and the components thus mix with one another before striking the opposite wall.

9 Claims, 3 Drawing Figures

MIXING DEVICE

The invention relates to a mixing device for mixing a plurality of components e.g. two components, to form a synthetic material, such as a cell-forming material, prior to a shape-imparting process.

One form of such a device is described in German Offenlegungschrift No. 2,112,535 in which the nozzles are arranged at a mutual angle of, for example, 60° and offers considerable advantages over the mixing of the components which are to be processed and to form the synthetic material, realised by the principle of countercurrent injection in another known mixing device having the same purpose. Apart from the risk of turbulence and the impairment of structure resulting therefrom, which risk is connected with the countercurrent injection, the mixing effect can be easily impaired by impurities and other influences effective in the sense of diverting the jets. The mixing device of the abovementioned Offenlegungsschrift does not suffer from these defects. But as a result of the experience gained in practice with this mixing device it appears to be desirable to improve it in various respects.

According to the present invention, there is provided a mixing device for mixing a plurality of components to provide a synthetic material, prior to a shape-imparting process, such device comprising a mixing chamber, a plurality of nozzles, for feeding the components into the mixing chamber, the nozzles being arranged so that their axes intersect at an angle, the point of intersection of said axes lying within the mixing chamber, and an outlet from said mixing chamber to conduct away the resulting synthetic material.

With such a construction it is possible to improve the mixing of the individual components, Secondly, it is possible to prevent the not yet mixed components depositing on the wall of the mixing chamber so that there is no necessity to clean the mixing device periodically.

In Offenlegungsschrift No. 2,112,535 the wall sections situated in jet direction form an obtuse angle between them, and are so arranged that the jets of material exiting from the nozzles impinge on the wall of the mixing chamber before they are mixed. At the points of impact films of liquid of the individual components are formed which, because of the inclination of the wall sections, flow towards one another and are then mixed.

In accordance with the invention, the mixing chamber extends beyond the intersection of the axes of the nozzle bores.

In order to nevertheless keep the volume of the mixing chamber as small as possible the region of the mixing chamber remote from the nozzle may constantly taper away from the nozzles. In this context it proves desirable for this region of the mixing chamber space to have a cross-sectional area lying in the plane of the nozzle axes when there are two nozzles, which area has the configuration of an isosceles triangle with its apex situated remote from the nozzles, the angle at the apex of the triangle corresponding to the angle between the nozzle axes. This angle advantageously lies between 50° and 70°, preferably at about 60°. From the point of view of keeping the mixing chamber space small it is furthermore advantageous for the apex of the triangular cross-sectional area to be situated directly along the bisector of the axes of the nozzles.

In contrast to the conditions prevailing in the mixing chamber described in Offenlegungsschrift No. 2,112,535 the kinetic energy of the jets of material is fully or optimally utilised for mixing the components in the mixing chamber according to the invention. The invention effectively prevents not yet mixed components depositing on the wall of the mixing chamber, because the walls forming the side of the mixing chamber remote from the nozzles is very much more steeply inclined, as compared to the known mixing chamber. Any deviation of the jets from the axial direction of the nozzle bore, such as can result from impurities present in the material for example, is not accompanied in the mixing chamber by a significant reduction of the mixing effect, since an intersection of the jets can be formed in any event.

It is clear that with respect to the rest of the construction which has not been described in detail above, the mixing device according to the invention can conform to that described in the Offenlegungsschrift No. 2,112,535 and can also be combined with the sprue device or feedhead described in detail therein. This especially applies to the design and actuation of the jet needles and to the mutual adaption of the mixing and sprue devices.

In order that the invention will be fully understood, the following description is given, by way of example only, reference being made to the accompanying drawings, in which.

Figure 1:
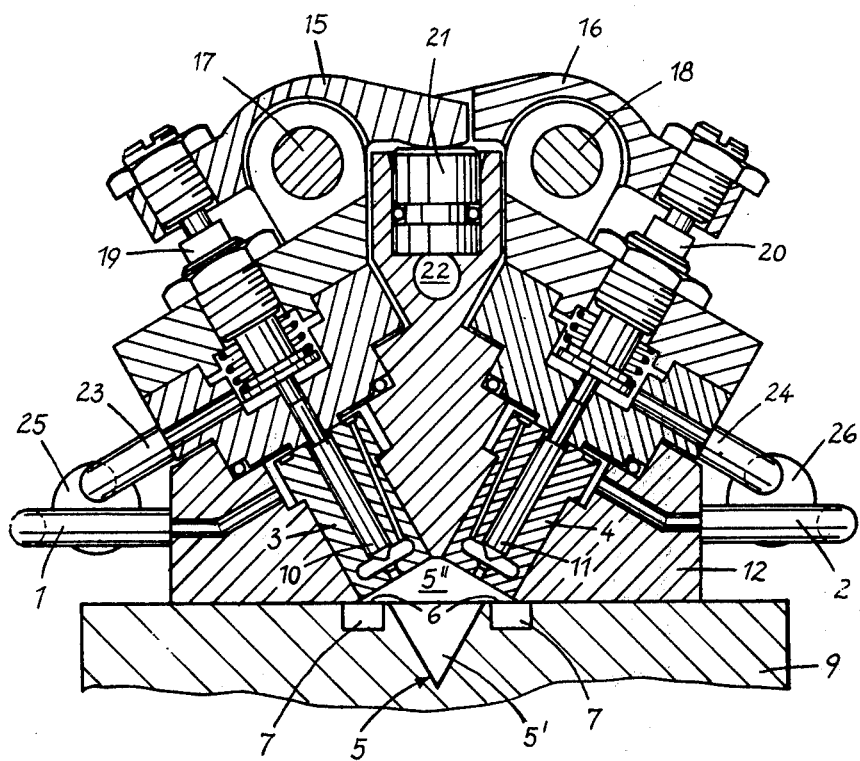
FIG. 1 is a vertical section through one embodiment of mixing device, according to the invention.

The mixing device shown in FIG. 1 is secured in known manner (cf. for exaple Offenlegungsschrift No. 2,112,535) to the moulding tool of an injection moulding machine. The liquid components which, by chemical reaction in the mould, form the synthetic material to be processed are fed to the mixing device via the lines 1 and 2 respectively, under pressure. They pass thence into the nozzle bodies, generally designated by the numerals 3 and 4 respectively, which advantageously lie in a common plane and are so arranged relative to one another that their axes form an angle. In the individual case this angle is so dimensioned that, despite the requirement stipulated by the invention that the mixing chamber space extend to beyond the intersection of the axes of the nozzle bores, the volume of the mixing chamber, generally designated by the numeral 5, is kept as small as possible. In the exemplary embodiment illustrated in the drawing this angle amounts to about 65°.

The mixing chamber 5 is formed of a first mixing space 5'' and a second mixing space 5' which lie one above the other, the base planes of which face one another, and which in the plane of the axes a, b of the nozzle bodies have a cross-sectional area having the shape of an isosceles triangle. Thus the mixing spaces 5', 5'' may be of conical or ridge-shaped form. In the embodiment illustrated, the base plane of the upper space 5'' is larger than that of the lower space 5', so that the upper space 5'' extends laterally beyond the lower space 5'. In the region of the resulting overlapping portion, there is located the outlet 6 for the liquid mixture formed in the chamber 5 to an annularly formed collection space 7 communicating with a sprue runner 8 (FIG. 3). The structural component 9 which accomodates the lower space 5' of the mixing chamber and the collection space 7 has the sprue runner formed therein. The upper space 5'' of the mixing chamber and the remaining parts of the mixing device, especially the nozzle bodies and the arrangements necessary for driving and controlling the nozzle needles 10, 11, are situated in the structural component generally designated by the reference numeral 12. Thus the collection space 7 and the lower space 5' are formed as recesses in the upper face of the component 9 and the upper conical mixing space 5'' is formed as a recess in the lower face of the structural component 12, these faces lying on the section line III—III traced in FIG. 2.

Figure 2:
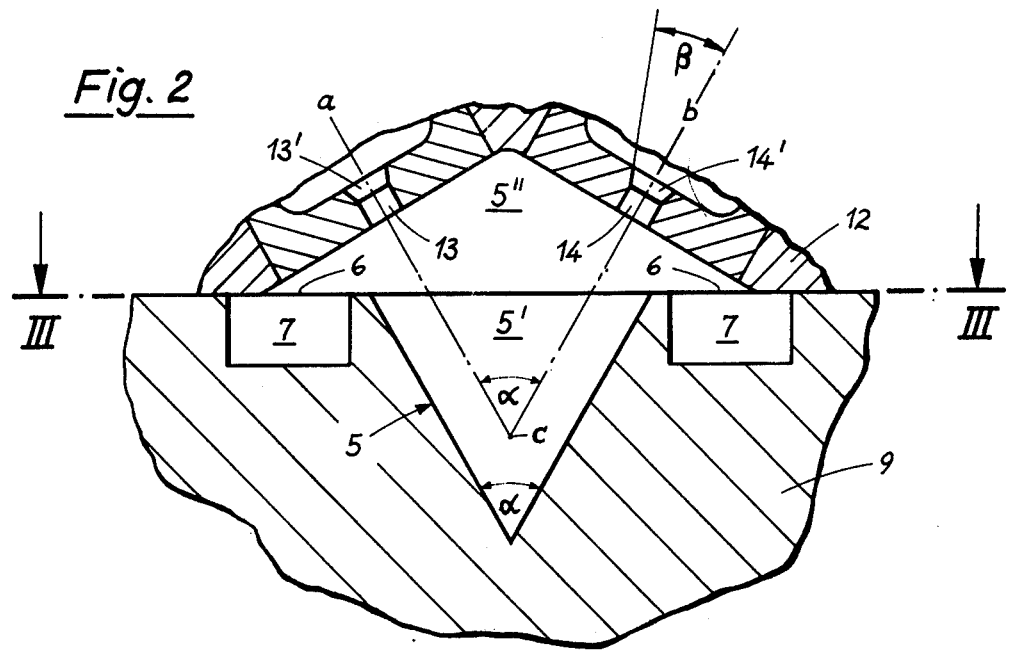
FIG. 2 shows on an enlarged scale essentially only that section of the device of FIG. 1 which embraces the mixing chamber, the collection space and the nozzle bore.
Figure 3:
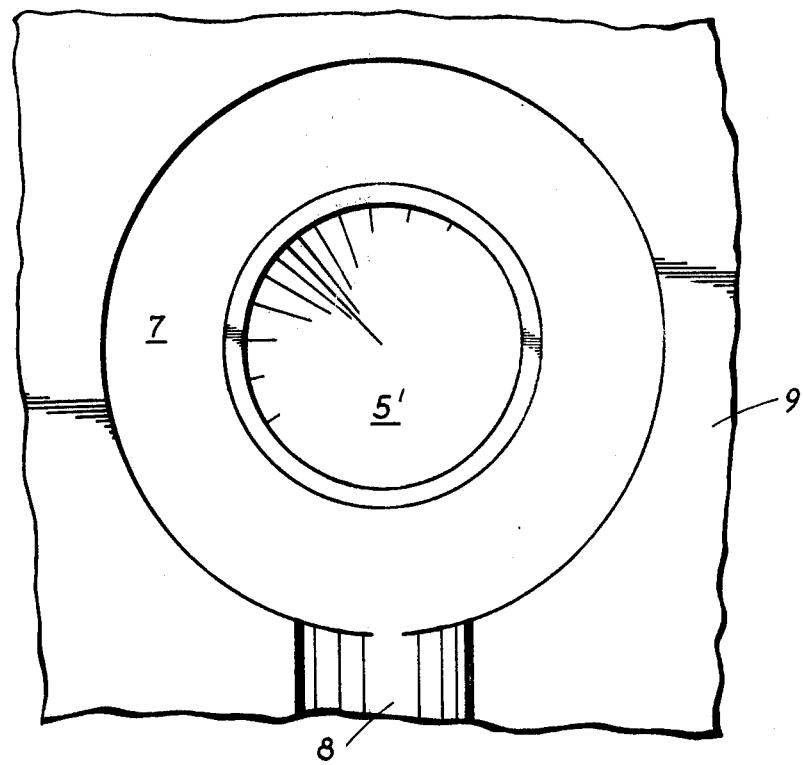
FIG. 3 is a section taken along the line III—III of FIG. 2.

As can best be seen in FIG. 2 the lower conical space 5', of the mixing chamber extends sufficiently far downwardly or into the structural component 9 that the axes a and b of the nozzle bores 13, 14 still intersect within the mixing chamber (cf. intersection c). In order nevertheless to keep the volume of the mixing chamber as small as possible, the lowest point of the mixing chamber should be located only a little below the intersection c. So that as narrowly defined as possible a mixing zone should be formed at this intersection the aperture angle $\beta$ of the conically or frustoconically formed sections 13', 14' is kept as small as possible (the lower limit of the angle is chosen to prevent congestion), so that the jets of material issuing from the nozzles into the mixing chamber fan out as little as possible and a substantially laminar flow characteristic can develop in the jets of material. In the illustration of FIG. 2 the abovementioned angle $\beta$ amounts to about 20°. It is further apparent from FIG. 2 that the angle $\alpha$ between the nozzle axes a and b corresponds to the angle $\alpha$ at the bottom of the mixing chamber space 5'.

For the purpose of varying or setting the exit cross-sections of the jets into the mixing chamber 5 there is provided a continuously adjustable stop for the stroke of the nozzle needles 10 and 11 in the nozzle bodies 3, 4. Depending on the opening stroke there thus results a more or less large cross-sectional area of the conical gaps formed by the frustoconically designed sections 13', 14' of the nozzle bores 13, 14. By virtue of this setting arrangement, it is thus possible to adapt, in a simple manner, the exit pulses of the jets to the various delivery quantities and densities of the respective mixture components being used. It is possible to envisage a mechanical-electrical, mechanical-pneumatic or mechanical-hydraulic system for the respective setting of the respective cross-sectional area of the jet exit. In FIG. 1 there is employed, by way of example, a hydraulically actuated rocker arm system in which two rocker arms 15, 16 are pivotably mounted, at 17 and 18 respectively, on the substantially ridge-shaped surface of the structural component 12. The rocker arm 15 is then connected with the nozzle needle 10 of the nozzle body 3 via a plunger 19 while the other rocker arm 16 acts on the nozzle needle 11 of the nozzle body 4 via a plunger 20. The rocker arms 15, 16, and thus also the plungers 19, 20 and the needles 10, 11, are actuated by means of a piston 21 which is guided for vertical displacement in the structural component 12 of the mixing device, and can be pressurised via a line 22. Any quantities of mixture components which may leak back can be discharged via the lines 23, 24 from which they pass into the collecting vessels 25, 26.

The operating sequence of a working cycle is as follows:

Metering pumps (not shown) begin to feed and build up the pressure which is set at the pressure valve in the line system via the feed lines 1, 2 as far as the nozzle bores 13, 14. At this time the nozzle bores are still closed by the nozzle needles 10, 11. This is caused by the piston 21 being pressurised via the line 22 whereby the nozzle needles are sealingly urged against the nozzle bore sections 13', 14' via the rocker arms 15, 16 and the plungers 19, 20, During this phase the mixing chamber 5 is in open communication with the cavity of the moulding tool via the collection space 7 and the sprue runner 8. The shut-off slide valve (not shown) arranged in this line system is at this time, in its open position.

When the desired pressure of the individual components, has been built up in the pressure lines, the piston 21 is depressurised by a specific amount which can be set. Since both rocker arms 15, 16 are actuated by the piston 21 the nozzle needles 10, 11 are opened simultaneously to the contemplated terminal position stroke by the pressure of the components. By virtue of the liquid components, flowing out of the nozzle bores 13, 14 into the mixing chamber 5 there now begins the actual mixing process which is advantageously limited by a timing circuit. The liquid mixture passes from the mixing chamber 5, via the collection passage 7 and the sprue runner 8, into the mould cavity. When the contemplated quantity of material is in the mould cavity, i.e., after the mixing and metering time has expired, then the shut-off slide valve is brought into its closing position while the nozzle needles 10, 11 of the nozzle bodies 3, 4 synchronously close. The metering pumps are also switched off at this moment and then relieved of pressure together with all material supply lines between the pumps and the mixing device.

I claim:

1. A mixing device for mixing a plurality of components to provide a synthetic material, prior to a shape-imparting process, said device comprising a mixing chamber having chamber walls, a plurality of nozzles for feeding the components into the mixing chamber, said mixing chamber comprising a portion remote from and tapering away from said nozzles and the chamber walls of said portion intersecting at the lowest point of the mixing chamber, the nozzles being arranged so that their axes intersect at an angle, the point of intersection of said axes lying within the mixing chamber whereby jets ejected from said nozzles impinge upon one another immediately above said lowest point of the mixing chamber, and an outlet from said mixing chamber to conduct away the resulting synthetic material.

2. A mixing device as claimed in claim 1, wherein the nozzles each include coaxially tapering portions, whereby the jets of each of said components have a substantially laminar flow downstream of said nozzles.

3. A mixing device as claimed in claim 2, wherein the apex angle of said conically tapering portions is between 15° and 20°.

4. A mixing device for mixing a plurality of components to provide a synthetic material, prior to a shape-imparting process, said device comprising a mixing chamber, a plurality of nozzles, for feeding the components into the mixing chamber, said mixing chamber comprising a first mixing space into which said nozzles open and a second mixing space remote from said nozzles, said second mixing space constantly tapering away from said nozzles, the nozzles being arranged so that their axes intersect at an angle, the point of intersection of said axes lying within the mixing chamber, and an outlet from said mixing chamber to conduct away the resulting synthetic material.

5. A mixing device as claimed in claim 4, wherein there are two nozzles and the second mixing space has an isosceles triangle cross-section, lying in the plane of the axes of the nozzles, with the apex of the isosceles triangle lying on the side of the point of intersection of said axes remote from the first mixing space, and the angle at said apex being substantially equal to the angle between the nozzle axes.

6. A mixing device as claimed in claim 5, wherein the apex of the isosceles triangle lies on the bisector of the angle between the nozzle axes.

7. A mixing device as claimed in claim 4, wherein said outlet comprises an annular collecting space surrounding the second mixing space and opening into first mixing space and a sprue runner leading from said annular collecting space.

8. A mixing device as claimed in claim 7, wherein the first mixing space extends laterally beyond the second mixing space, to enable the collecting space to open into the first mixing space.

9. A mixing device as claimed in claim 8, wherein said mixing chamber comprises first and second structural parts, said first mixing space being formed as a recess in a face of said first structural part and said second mixing space and said annular collecting space being formed as recesses in an abutting face of said second structural part.

* * * * *